United States Patent
Leppanen et al.

(10) Patent No.: US 10,916,057 B2
(45) Date of Patent: Feb. 9, 2021

(54) METHOD, APPARATUS AND COMPUTER PROGRAM FOR DISPLAYING AN IMAGE OF A REAL WORLD OBJECT IN A VIRTUAL REALITY ENVIROMENT

(71) Applicant: Nokia Technologies Oy, Espoo (FI)

(72) Inventors: Jussi Artturi Leppanen, Tampere (FI); Pasi Saari, Jyvaskyla (FI); Erika Reponen, Tampere (FI); Arto Juhani Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/509,034

(22) PCT Filed: Sep. 11, 2015

(86) PCT No.: PCT/FI2015/050595
§ 371 (c)(1),
(2) Date: Mar. 6, 2017

(87) PCT Pub. No.: WO2016/038253
PCT Pub. Date: Mar. 17, 2016

(65) Prior Publication Data
US 2017/0263056 A1 Sep. 14, 2017

(30) Foreign Application Priority Data
Sep. 11, 2014 (EP) .................................... 14184455

(51) Int. Cl.
*G06T 19/00* (2011.01)
*G06F 3/0489* (2013.01)
(Continued)

(52) U.S. Cl.
CPC ............ *G06T 19/006* (2013.01); *G06F 3/011* (2013.01); *G06F 3/012* (2013.01); *G06F 3/013* (2013.01);
(Continued)

(58) Field of Classification Search
None
See application file for complete search history.

(56) References Cited

U.S. PATENT DOCUMENTS

| | | |
|---|---|---|
| 2006/0033724 A1 | 2/2006 | Chaudhri et al. |
| 2011/0148935 A1 | 6/2011 | Arrasvouri |

(Continued)

FOREIGN PATENT DOCUMENTS

| | | | |
|---|---|---|---|
| CN | 103995352 A | | 8/2014 |
| JP | 2008077572 | * | 4/2008 |

(Continued)

OTHER PUBLICATIONS

International Search Report and Written Opinion received for corresponding Patent Cooperation Treaty Application No. PCT/FI2015/050595, dated Feb. 12, 2015, 16 pages.
(Continued)

*Primary Examiner* — Sarah Le
(74) *Attorney, Agent, or Firm* — Alston & Bird LLP (57) ABSTRACT

Examples of the present disclosure relate to a method, apparatus and computer program for displaying images. In certain examples, a real world physical object, which is located in a real world point of view of a user of a head mountable display, is detected. Such a detection triggers a display, on the head mountable display, of at least one captured image of at least a part of the detected real world physical object.

18 Claims, 7 Drawing Sheets

(51) Int. Cl.
G06F 3/01 (2006.01)
G02B 27/01 (2006.01)
(52) U.S. Cl.
CPC ........ *G06F 3/04895* (2013.01); *G02B 27/017* (2013.01); *G02B 2027/014* (2013.01); *G02B 2027/0138* (2013.01); *G02B 2027/0187* (2013.01)

(56) References Cited

U.S. PATENT DOCUMENTS

| | | | | |
|---|---|---|---|---|
| 2012/0113223 | A1* | 5/2012 | Hilliges | G06F 3/00 348/46 |
| 2012/0249587 | A1 | 10/2012 | Anderson et al. | |
| 2012/0249741 | A1* | 10/2012 | Maciocci | G06F 3/011 348/46 |
| 2013/0102372 | A1* | 4/2013 | Lutnick | G07F 17/3293 463/13 |
| 2013/0257732 | A1 | 10/2013 | Duffield | |
| 2013/0325438 | A1 | 12/2013 | Griffin et al. | |
| 2013/0328762 | A1 | 12/2013 | McCulloch et al. | |
| 2014/0002491 | A1 | 1/2014 | Lamb et al. | |
| 2014/0078176 | A1 | 3/2014 | Kim et al. | |
| 2014/0218361 | A1 | 8/2014 | Abe et al. | |
| 2014/0364212 | A1 | 12/2014 | Osman et al. | |
| 2015/0091780 | A1* | 4/2015 | Lyren | G02B 27/017 345/8 |
| 2015/0161762 | A1 | 6/2015 | Fujiwara | |
| 2015/0352437 | A1 | 12/2015 | Koseki et al. | |
| 2015/0363979 | A1 | 12/2015 | Takano et al. | |
| 2016/0292922 | A1 | 10/2016 | Kasahara | |
| 2016/0379413 | A1 | 12/2016 | Yamamoto et al. | |
| 2017/0192620 | A1* | 7/2017 | Kim | G02B 27/02 |

FOREIGN PATENT DOCUMENTS

| | | |
|---|---|---|
| JP | 2009 025918 A | 2/2009 |
| JP | 2010 533006 A | 10/2010 |
| JP | 2012 204998 A | 10/2012 |
| JP | 2014 149712 A | 8/2014 |
| JP | 2014 164503 A | 9/2014 |
| JP | 2015 114757 A | 6/2015 |
| JP | 2015 232783 A | 12/2015 |
| JP | 2016 532178 A | 10/2016 |
| WO | WO 2008/108965 A1 | 9/2008 |
| WO | WO 2014/188798 A1 | 11/2014 |
| WO | WO 2015/111283 A1 | 7/2015 |

OTHER PUBLICATIONS

Bruder G et al. "Enhancing Presence in Head-Mounted Display Environments by Visual Body Feedback Using Head-Mounted Cameras", Cyberworlds, 2009, CW '09, International Conference on, IEEE Piscathaway, NJ USA, Sep. 7, 2009, (209-09-07), pp. 43-50.
Sooyung Kim et al. "Using Keyboards with head mounted displays", Virtual Reality Continuum and its Applications Proceedings of the 2004 ACM Siggraph International Conference on Virutal Reality Continuum and its Applications in Industry, ACM New York, NY, US, Jun. 15, 2004, pp. 336-343.
"Object Detection and Recogition", YouTube, Retrieved on Apr. 11, 2017, Webpage available at : https://www.youtube.com/watch?v=tlC2O9T9jks.
"Real Time Hand Posture/Gesture Recognition with OpenCV", YouTube, Retrieved on Apr. 11, 2017, Webpage available at : https://www.youtube.com/watch?v=kQxiFaZbOfA.
"OculusVR", Oculus, Retrieved on Apr. 11, 2017, Webpage available at : https://www.oculus.com/.
"We Strapped Into an Oculus Rift With a Leap Motion Controller and Punched Sharks at SXSW 2014", PopularMechanics, Retrieved on Mar. 10, 2017, Webpage available at : http://www.popularmechanics.com/culture/gaming/a10195/in-which-we-strapped-into-an-oculus-rift-rigged-with-a-leap-motion-controller-and-punched-sharks-at-sxsw-2014-16577007/.
"Leap Motion Skeletal Tracking SDK Now in Public Beta", Reddit, Retrieved on Mar. 10, 2017, Webpage available at : https://www.reddit.com/r/oculus/comments/25kttf/leap_motion_skeletal_tracking_sdk_now_in_public/.
"Nock: Hidden Arrow Available on Early Access", Indienerds, Retrieved on Apr. 11, 2017, Webpage available at : http://indienerds.com/wordpress/.
Extended European Search Report received for corresponding European Patent Application No. 14184455.5, dated Dec. 3, 2014, 11 pages.
Office Action for Japanese Application No. 2017-513647 dated Mar. 6, 2018, 7 pages.
Office Action for Japanese Application No. 2017-513647 dated Nov. 14, 2018, 7 pages.
Office Action for Chinese Application No. 2015800488588 dated Feb. 3, 2019, 13 pages.
Office Action for Japanese Application No. 2017-513647 dated Jul. 30, 2019, 6 pages.
Office Action for European Application No. 14184455.5 dated Dec. 12, 2019, 9 pages.
Mexican Institute of Industrial Property, Office Action for Application No. MX/a/2017/003204, dated Mar. 11, 2020, 16 pages, Mexico.
Office Action for Chinese Application No. 201580048858.8, dated Feb. 3, 2020, 9 pages.
Office Action for Mexican Application No. MX/a/2017/003204 dated Oct. 16, 2019, 6 pages.
Summons to Attend Oral Proceedings for European Application No. 14184455.5 dated Aug. 14, 2020, 10 pages.
The State Intellectual Property Office of the PRC, Office Action received for Application No. 201580048858.8, dated Jun. 10, 2020, 8 pages, China.
Intellectual Property India, Examination Report received for Application No. 201747012301, dated Jun. 30, 2020, 10 pages, India.
Intellectual Property Office of Vietnam, Office Action recieved for Application No. 1-2017-01176, dated Jul. 20, 2020, 4 pages, Socialist Republic of Vietnam.
Office Action for Chinese Application No. 2015800488588 dated Sep. 26, 2019, 12 pages.
Office Action for Mexican Application No. MX/a/2017/003204 dated Oct. 22, 2020, with English translation, 10 pages.
Office Action for Chinese Application No. 201580048858.8, dated Nov. 6, 2020, with English translation, 5 pages.

* cited by examiner

METHOD, APPARATUS AND COMPUTER PROGRAM FOR DISPLAYING AN IMAGE OF A REAL WORLD OBJECT IN A VIRTUAL REALITY ENVIROMENT

RELATED APPLICATION

This application was originally filed as PCT Application No. PCT/FI2015/050595 filed Sep. 11, 2015, which claims priority benefit from EP Patent Application No. 14184455.5 filed Sep. 11, 2014.

TECHNOLOGICAL FIELD

Examples of the present disclosure relate to a method, apparatus and computer program for displaying images. Some examples, though without prejudice to the foregoing, relate to a method, apparatus and computer program for displaying a captured image of the real world in a virtual reality display device.

BACKGROUND

Virtual reality display devices (for example such as a head mountable display (HMD), a near eye display (NED), virtual reality goggles/helmet) are typically fully immersive in that a user of a virtual reality display device may only be able to see what is displayed on a display of the virtual reality display device, e.g. what is happening in the virtual world. However, such fully immersive virtual reality display devices present issues where a user of a virtual reality display device would wish to interact with the real world.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The present invention is as set out in the independent claims.

According to at least some but not necessarily all examples of the disclosure there is provided a method comprising causing, at least in part, actions that result in:
  detecting a real world physical object located in a real world point of view of a user of a head mountable display; and
  triggering, in response to said detection, a display on the head mountable display of at least one captured image of at least a part of the detected real world physical object.

According to at least some but not necessarily all examples of the disclosure there is provided an apparatus comprising means configured to enable the apparatus at least to perform the above method.

According to at least some but not necessarily all examples of the disclosure there is provided an apparatus comprising: at least one processor; and at least one memory including computer program code; the at least one memory and the computer program code configured to, with the at least one processor, cause the apparatus at least to perform the above method According to at least some but not necessarily all examples of the disclosure there is provided a computer program that, when performed by at least one processor, causes at least the above method to be performed.

According to at least some but not necessarily all examples of the disclosure there is provided a non-transitory computer readable medium encoded with instructions that, when performed by at least one processor, causes at least the above method to be performed.

According to at least some but not necessarily all examples of the disclosure there is provided a chipset or module comprising processing circuitry configured to cause the performance of at least the above method.

The examples presently discussed and the accompanying claims may be suitably combined in any manner apparent to one of ordinary skill in the art.

BRIEF DESCRIPTION OF THE DRAWINGS

For a better understanding of various examples of the present disclosure that are useful for understanding the detailed description and certain embodiments of the invention reference will now be made by way of example only to the accompanying drawings in which:
FIGS. 6A, 7A and 8A schematically show an apparatus in use with
  FIGS. 6B, 7B and 8B showing corresponding example screenshots of a display of the apparatus.

DETAILED DESCRIPTION

The Figures schematically illustrate a method comprising causing, at least in part, actions that result in:
  detecting (101) a real world physical object (601) located in a real world point of view (602) of a user (603) of a head mountable display (610);
  triggering (102), in response to said detection, a display on the head mountable display (610) of at least one captured image (601') of at least a part of the detected real world object (601).

Without limiting the scope of the claims, an advantage of some examples of the present disclosure may be to enable a user to see captured images of a real world object when wearing a head mountable display thereby facilitating user interaction with the physical real world object. In certain particular examples, the head mountable display is configured to display a virtual reality environment and the real world object which is detected and whose captured image is displayed corresponds to a user input device for controlling or communicating in the virtual reality environment. In some regards, one might think of examples of the present disclosure providing 'augmented virtual reality' (c.f. 'augmented reality') wherein virtual reality is augmented with 'reality' i.e. captured images of real world objects.

A head mountable display (HMD) may, for example, be a wearable display device and may comprise a near eye display (NED). The head mountable display may take the form of, for example: glasses, goggles or a helmet. The head mountable display may be configured as a virtual reality display device to display a virtual reality environment in addition to the captured images of the real world physical object.

A real world point of view of a user may be, for example, the user's real world: viewpoint, field of view, perspective, line of sight or frame of reference. The user's real world point of view may depend upon or relate to an orientation/direction of a user's eyes and/or head.

Various examples of the present disclosure will now be described with reference to the Figures. Similar reference numerals are used in the Figures to designate similar features. For clarity, all reference numerals are not necessarily displayed in all figures.

Figure 1:
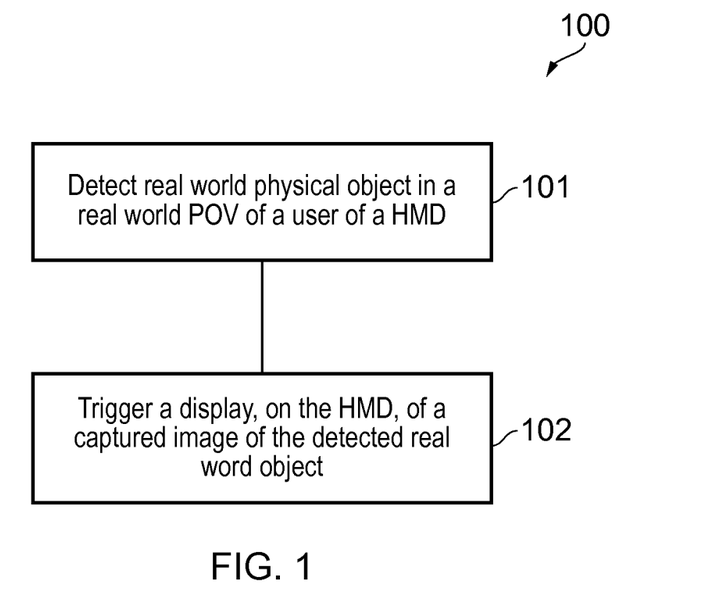
FIG. 1 schematically illustrates a method.

FIG. 1 schematically illustrates a flow chart of a method 100 according to an example of the present disclosure. The component blocks of FIG. 1 are functional and the functions described may or may not be performed by a single physical entity (such as is described with reference to 300 FIG. 3).

Figure 7A:
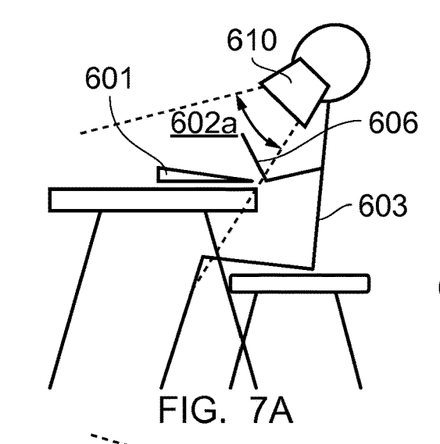
Figure 7B:
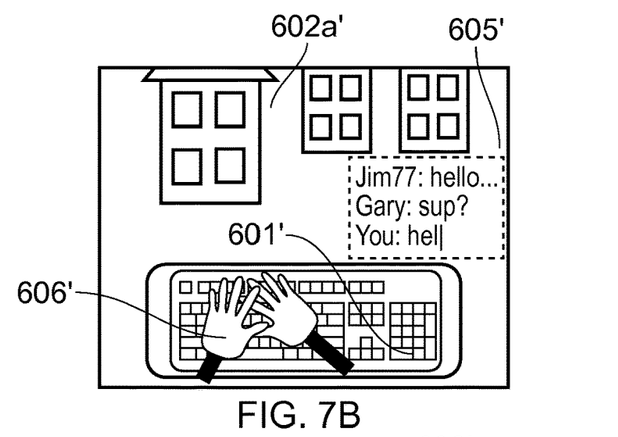

In block 101, a real world physical object (e.g. keyboard 601 of FIG. 7A), located in a real world point of view (602a of FIG. 7A) of a user (603 of FIG. 7A) of a head mountable display (610 of FIG. 7A), is detected. In block 102, the detection of the real world physical object (601) in the user's real world point of view (602a) triggers the generation of a display on the head mountable display (610) of at least one captured image (601' of FIG. 7A) of at least a part of the detected real world object.

Figure 2:
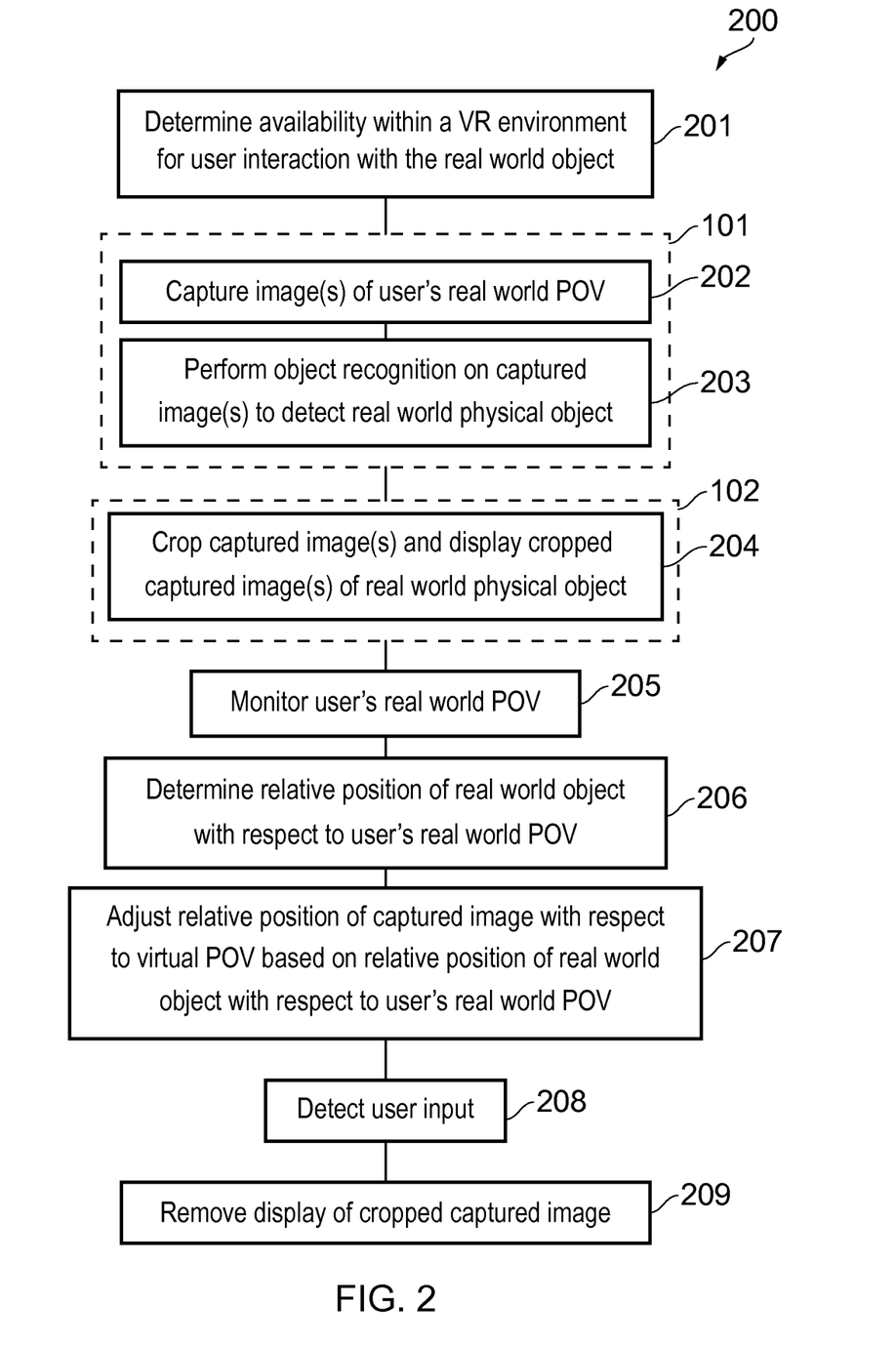
FIG. 2 schematically illustrates a yet further method.

FIG. 2 schematically illustrates a flow chart of a further method 200 according to an example of the present disclosure. The flowchart of FIG. 2 represents one possible scenario among others. The order of the blocks shown is not absolutely required, so in principle, the various blocks can be performed out of order. Also, not all the blocks are essential.

Figure 6A:
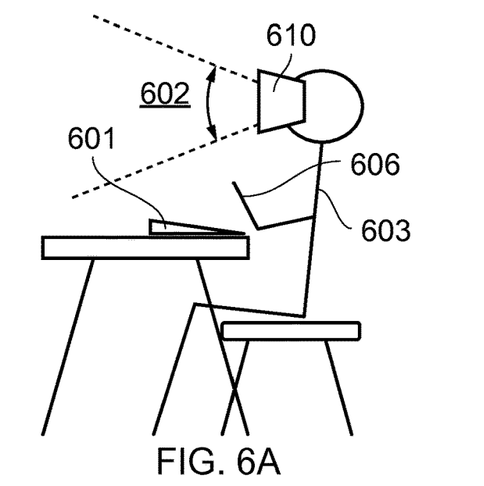
Figure 6B:
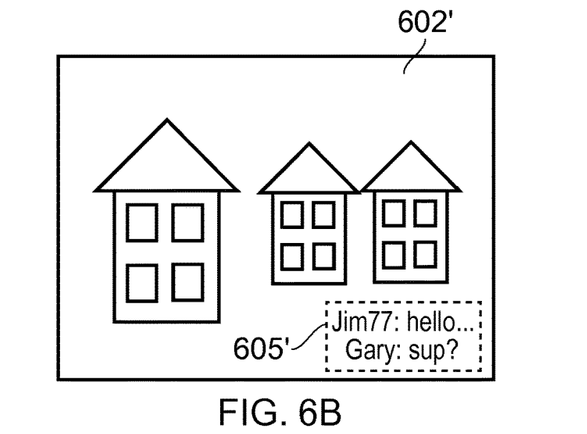

In method 200, a user uses a head mountable display to view a virtual reality environment (e.g. virtual world 602' of FIG. 6B). In block 201, a determination is made as to whether or not there is an availability/opportunity within the virtual reality environment for user interaction with the real world object. For example, where the real world object is a user input device for providing user input (such as command or communication) into the virtual reality environment, a determination may be made as to whether or not there is an appropriate opportunity for user input via the user input device. In certain particular examples, such as shown in FIGS. 6A to 8B, this may correspond to a pop up chat box 605' or other opportunity for text input. Responsive to block 201's determination of an availability for user interaction with a real world object, this may then trigger the procedure for detecting the real world physical object in the user's real world point of view as per block 101.

Since showing a captured image(s) of the real world object takes up display space on the head mountable display, it is desirable to only show the captured image(s) when necessary. In some examples of the disclosure, by only commencing the process of block 101 following a determination of an opportunity for user interaction via the real world object, this may provide the technical effect of avoiding the detection of block 101 and the subsequent display of block 102 needlessly occurring when there is no opportunity for a user to interact with the real world object. For example, if there is no opportunity for text input, this avoids the needless detection of the keyboard and displaying a captured image(s) of the same in the virtual reality environment, which would otherwise not only waste resources (e.g. not least processing and power) but also avoid obscuring the virtual reality environment and thus needlessly adversely affecting the user's immersion level in the virtual reality environment.

In response to the determination process of block 201, the detection of a real world physical object in a real world point of view of the user may occur in block 101. This detection may comprise, in block 202 the capturing of one or more images of at least a part of the user's real world point of view. This may be achieved for example via the head mountable display comprising one or more image capturing devices that are appropriately positioned and aligned on the head mountable display such that they capture one or more $1^{st}$ person perspective images corresponding to an object scene of the user's real world point of view, i.e. in effect, capture one or more images of the real world scene that the user would see were the user not wearing the head mountable display. In block 203 an object/image recognition process is performed on the one or more images captured in block 202 in order to identify and detect a real world physical object, for example the real world physical object for which the determination step 201 determined there is an availability to interact with. The real world physical object to be detected via the object/image recognition may correspond to one or more predetermined physical objects, for example user input devices such as keyboards, keypads, game controllers, and other hand operated input devices including touch sensitive input devices and touch sensitive displays.

Having detected a real world physical object in a real world point of view 602a of the user, one or more images of the detected real world object is caused to be displayed on the head mountable display in block 102. As shown in block 204, this may involve cropping the captured image(s) of the user's entire real world point of view such that the cropped image(s) consists substantially just of the detected real world physical object. The cropped image(s) (e.g. 601' of FIG. 7B) may then be displayed on a display of the head mountable display simultaneously with a display of the virtual reality environment (602a'). Thus, a mixing of virtual reality and real world images is provided in which captured image(s) of the real world object are integrated into a display of a virtual environment.

In block 205, the user's point of view is monitored and tracked. This may be achieved by one or more orientation or directional sensors mountable in the head mountable display that can monitor and detect changes in the orientation and direction of the head mountable display and thus determining the real world point of view of the user wearing the head mountable display based on a sensed direction and orientation (e.g. yaw, pitch and roll) of the user's head. In an alternative example, instead of determining a user's point of view based on the user's head movement, the user's point of view may be determined based on a direction and orientation of the user's eyes. In this example, one or more devices for sensing an orientation and direction of view of a user's eyes may be provided in the head mountable display, such as internally mounted camera's facing towards the user's eyes tracking the user's eye movement.

In block 206, a relative position of the real world object with respect to the user's real world point of view is determined. This may be achieved, for example, based on an analysis of the image(s) captured from the user's real world point of view and determining the position of the detected real world object in the captured image(s). In block 207, this determined relative position of the real world object with respect to the user's real world point of view is used to adjust the relative position of the displayed captured image(s) of the real world object within the display of the head mountable display. In particular, the position of the captured image(s) in the display is adjusted such that its relative position in a displayed perspective of the virtual environment/the user's virtual point of view corresponds to the determined relative position of the real world object with respect to the user's real world point of view. Without limiting the scope of the claims, an advantage of some examples of the present disclosure may be to enable the captured image(s) to be displayed at a virtual position in the display of the head mountable display which corresponds to a real world position of the object with respect to the user's real world point of view. By tracking the relative position of the real world object with respect to the user's real world point of view, a correspondence can be maintained between the position of the real world object relative to the user's real world point of view/real world frame of reference and the position of the displayed captured image(s) of the real world object relative to the user's virtual point of view/virtual frame of reference.

In block 208, a user input may be detected, such as a predetermined gesture captured and recognised by the image capturing device of the head mountable display, which causes, in block 209, the removal of the display of the captured image(s). This enables a user to selectively control the removal of the display of the captured image(s) where the user no longer desires/requires its display. For example, the user may have completed his or her interaction with the real world object and/or does not desire to interact with the real world object and thus does not need to be presented with a captured image(s) of the same.

The above described method discusses the capturing of one or more images of a user's real world point of view and displaying one or more images in a display of a head mountable display based on the captured images. It is to be appreciated that the captured at least one image may correspond to any of: a sequence of images, a video, real time images. The at least one captured image which is displayed may also correspond to a live camera feed of a region where the object is detected. Without limiting the scope of the claims, an advantage of some examples of the present disclosure may be to enable a user to see for his or herself, his or her own user interaction with the real world object in real time thereby facilitating the user's interaction with the real world object whilst still wearing the head mountable display and viewing the virtual reality environment (e.g. seeing a display of the user's own hands 606' over the keyboard 601' as shown in FIG. 7B).

In certain examples one or more blocks may be performed in a different order or overlapping in time, in series or in parallel one or more blocks may be omitted or added or changed in some combination of ways. For example, blocks 208 and 209 could be moved or added to any part of the flowchart, for example before or after any of blocks 201, 101 and 102.

Examples of the present disclosure may take the form of a method, an apparatus or a computer program. Accordingly, examples may be implemented in hardware, software or a combination of hardware and software.

The blocks illustrated in FIGS. 1 and 2 may represent actions in a method and/or sections of instructions/code in a computer program.

It will be understood that each block and combinations of blocks, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory storage device and performed by a processor.

As will be appreciated, any such computer program instructions may be loaded onto a computer or other programmable apparatus (i.e., hardware) to produce a machine, such that the instructions when performed on the programmable apparatus create means for implementing the functions specified in the blocks. These computer program instructions may also be stored in a computer-readable medium that can direct a programmable apparatus to function in a particular manner, such that the instructions stored in the computer-readable memory produce an article of manufacture including instruction means which implement the function specified in the blocks. The computer program instructions may also be loaded onto a programmable apparatus to cause a series of operational actions to be performed on the programmable apparatus to produce a computer-implemented process such that the instructions which are performed on the programmable apparatus provide actions for implementing the functions specified in the blocks.

Figure 3:
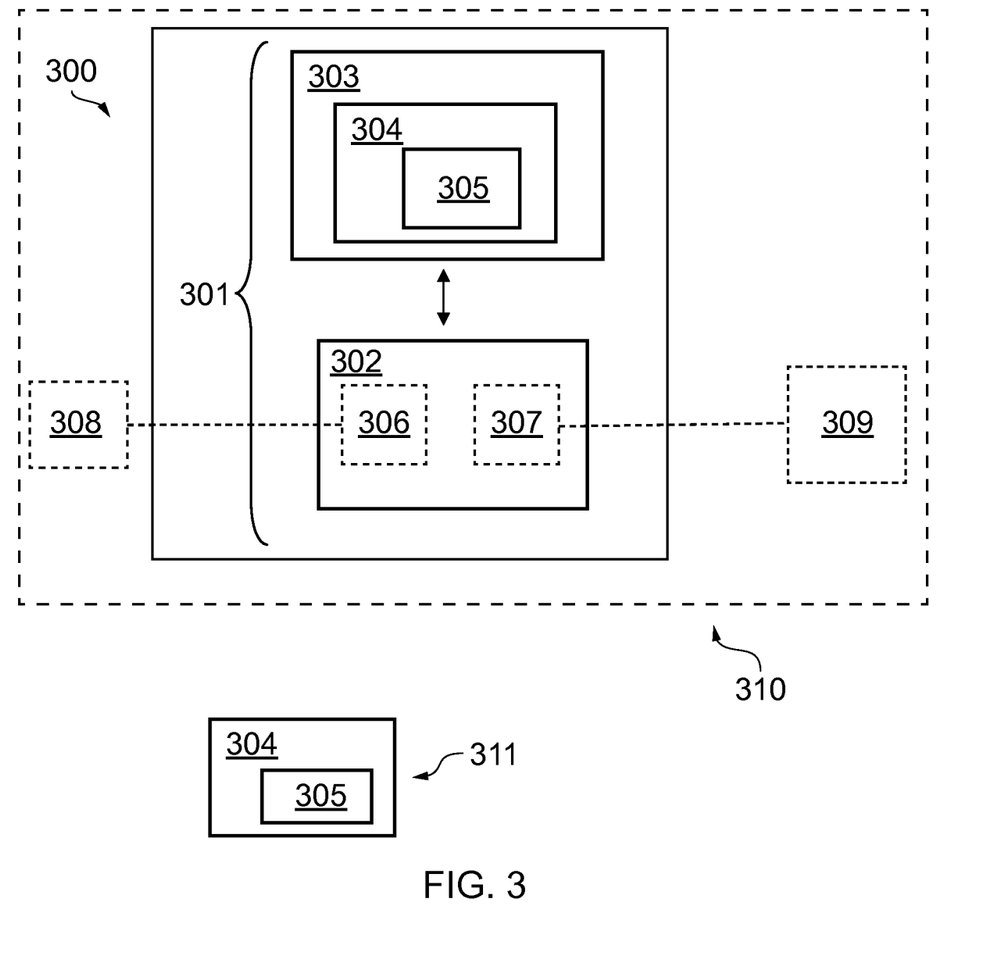
FIG. 3 schematically illustrates an apparatus.

An apparatus 300 according to an example in the present disclosure will now be described with respect to FIG. 3. FIG. 3 focuses on the functional components necessary for describing the operation of the apparatus.

The apparatus 300 comprises a controller 301. Implementation of the controller 301 can be in hardware alone (e.g. processing circuitry comprising one or more processors and memory circuitry comprising one or more memory elements), have certain aspects in software including firmware alone or can be a combination of hardware and software (including firmware).

The controller 301 may be implemented using instructions that enable hardware functionality, for example, by using executable computer program instructions in a general-purpose or special-purpose processor that may be stored on a computer readable storage medium (disk, memory etc) or carried by a signal carrier to be performed by such a processor.

In the illustrated example, the apparatus 300 comprises a controller 301 which is provided by a processor 302 and memory 303. Although a single processor and a single memory are illustrated in other implementations there may be multiple processors and/or there may be multiple memories some or all of which may be integrated/removable and/or may provide permanent/semi-permanent/dynamic/cached storage.

The memory 303 stores a computer program 304 comprising computer program instructions 305 that control the operation of the apparatus when loaded into the processor 302. The computer program instructions provide the logic and routines that enable the apparatus to perform the methods presently described.

The at least one memory 303 and the computer program instructions 305 are configured to, with the at least one processor 302, cause the apparatus 300 at least to perform the method described, for example with respect to FIGS. 1 and 2.

The processor 302 is configured to read from and write to the memory 303. The processor 302 may also comprise an input interface 306 via which data (not least for example image capture data for detecting and displaying an image of a real world object, sensor data to determine the user's point of view, virtual reality environment data for displaying a virtual reality environment and user input data) and/or commands are input to the processor 302. The processor 302 may also comprise an output interface 307 via which data (not least for example captured image data of the real world object, and virtual reality environment data for displaying on the head mountable display) and/or commands are output by the processor 302.

The computer program may arrive at the apparatus 300 via any suitable delivery mechanism 311. The delivery mechanism 311 may be, for example, a non-transitory computer-readable storage medium, a computer program product, a memory device, a record medium such as a compact disc read-only memory or digital versatile disc, or an article of manufacture that tangibly embodies the computer program 304. The delivery mechanism may be a signal configured to reliably transfer the computer program 304.

The apparatus 300 may receive, propagate or transmit the computer program 304 as a computer data signal.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The apparatus may, for example, be: circuitry, a chipset, module or a device/system 310 which additionally comprises additional devices/components for example one or more: image capturing devices 308, display devices 309, and sensors (not shown) for detecting and monitoring a user's real world point of view. The apparatus may be comprised in the head mountable display or may be separate from the head mountable display and in communication (direct or otherwise) therewith, for example via a wired or wireless communication. The apparatus may be for displaying, on a head mountable display, at least one captured image of at least a part of a real world object detected within a real world point of view of a user of the head mountable display.

Figure 4:
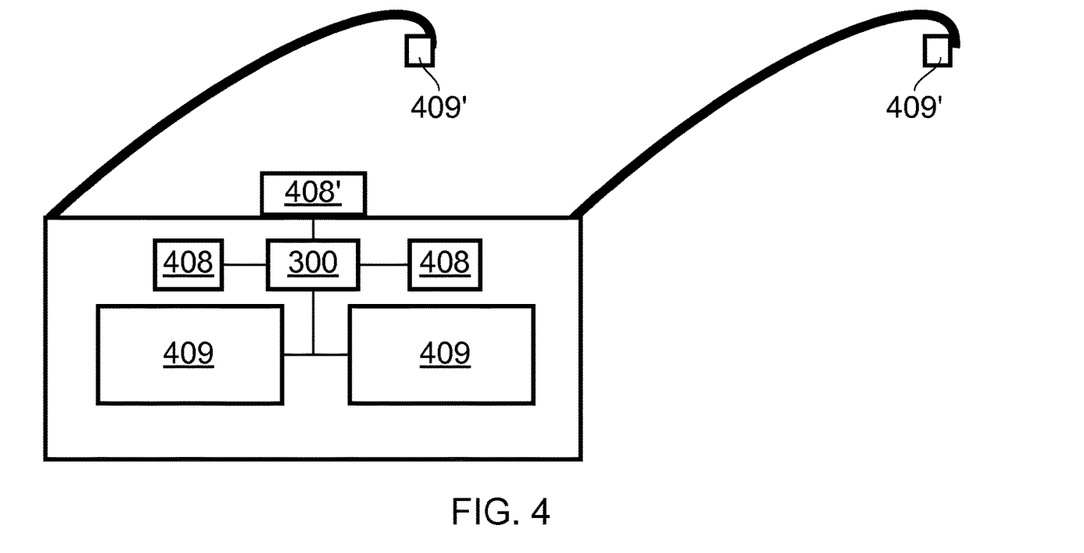
FIG. 4 schematically illustrates a further apparatus.

FIG. 4 schematically illustrates a further apparatus 410 according to an example of the present disclosure. The apparatus 410 is in the form of a head mountable display providing a near eye display device, in particular in the form of glasses/goggles to be worn by a user. The head mountable display may provide an opaque/non-transparent/non-see through wearable display.

The device 410 comprises the apparatus 300 FIG. 3 and additionally two display devices 409 to provide stereoscopic display to the user and two image capturing devices 408 and 408 to enable stereoscopic image capturing of the user's real world point of view. The device may comprise one or more sensors 408' to detect and monitor a user's real world point of view (e.g. sensors for measuring direction/orientation). The device may also comprise one or more audio output devices 409'. Furthermore, the device may additionally comprise a communication interface (not shown) for communicating with remote computing devices, e.g. a data source which provides the data for a virtual reality environment displayed on the device.

The apparatus 300/410 may additionally provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

Although the apparatuses above have been described above in terms of comprising various components, it should be understood that the components may be embodied as or otherwise controlled by a corresponding processing element or processor of the apparatus. In this regard, each of the components described below may be one or more of any device, means or circuitry embodied in hardware, software or a combination of hardware and software that is configured to perform the corresponding functions of the respective components as described in greater detail below.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device."

Examples of the present disclosure provide both a method and corresponding apparatus consisting of various modules or means that provide the functionality for performing the actions of the method. The modules or means may be implemented as hardware, or may be implemented as software or firmware to be performed by a computer processor. In particular, in the case of firmware or software, examples of the present disclosure can be provided as a computer program product including a computer readable storage structure embodying computer program instructions (i.e. the software or firmware) thereon for performing by the computer processor.

The apparatus may be provided in a module. As used here 'module' refers to a unit or apparatus that excludes certain parts/components that would be added by an end manufacturer or a user. For example, the apparatus could be provided as a module to be used in conjunction with a head mountable display.

While in certain implementation examples the apparatus may be provided in the head mountable display itself, other types of electronic devices, such as, but not limited to, hand portable electronic devices, tablets, mobile phones, personal digital assistants (PDAs), pagers, mobile computers, desktop computers, televisions, gaming devices, laptop computers, cameras, video recorders and other types of electronic systems, may be provided with apparatuses in accordance with examples of the present disclosure. Such other devices and types of systems being configured to communicate with and control the display of a head mountable device.

Figure 5:
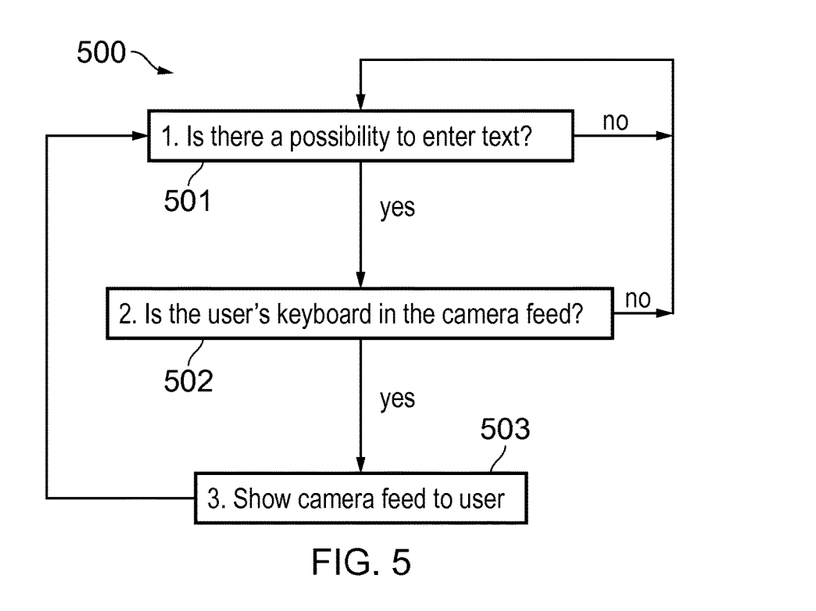
FIG. 5 schematically illustrates a method flow chart.

FIG. 5 shows a flow chart 500 of a particular example of the present disclosure relating to the input of text entry via a keyboard in a virtual reality environment/world. Reference is also made to FIGS. 6A to 8B.

Firstly, in block 501, it is determined whether or not a user is able to input anything using a keyboard. Since showing the user's keyboard in the virtual environment/world view takes up screen space, it is desirable to show the keyboard only when necessary. If there is no possibility of inputting anything, the sequential parts of the process are not carried out and the keyboard will not be shown. If there is no possibility to enter text the system waits until there is a possibility to enter text before continuing on with the procedure.

The possibility to enter text may correspond to a chat window comment box 605' being present/displayed in the virtual environment 602'. This may indicate that keyboard input is possible. If there is a possibility to enter text the flow chart continues to block 502.

Figure 8A:
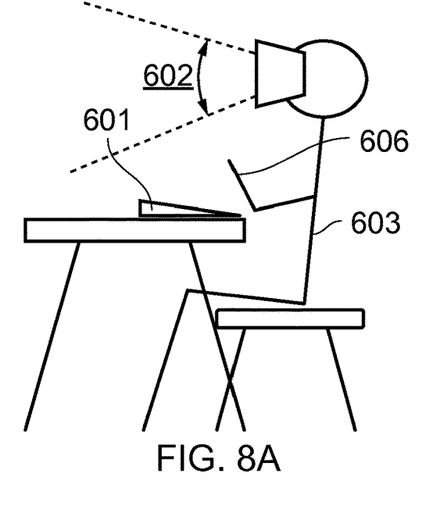
Figure 8B:
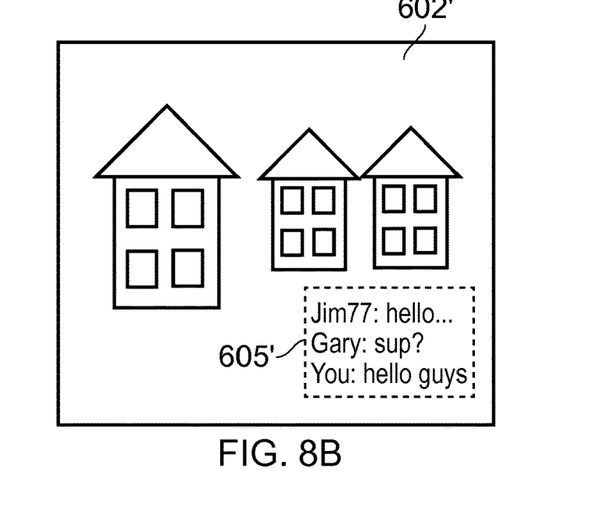

In block 502, it is determined whether or not the keyboard is in a viewpoint of a camera of the head mountable display device and thus if the keyboard is in the user's real world point of view. If the user's keyboard is not in the camera feed, (i.e. as per FIG. 6A) the system waits until such time that the keyboard is in the camera feed and/or there is a possibility to enter text. In FIGS. 6A and 8A, the user's real world point of view 602 is such that the keyboard 601 is not located within the user's real world point of view 602. Accordingly, no image of the keyboard is captured and displayed on the head mountable display, as shown in FIGS. 6B and 8B in which there is only the display of the virtual world environment 602'. The virtual world environment 602a' displayed has a virtual point of view 602a' corresponding to the user's real world point of view 602a, for example, were the user to turn his/her head to the left, right or upwards, the perspective of the virtual environment displayed would adjust so as to represent a corresponding virtual perspective/viewpoint looking towards the left, right or upwards.

If the keyboard is in the camera's view (e.g. the user's looks down such that the camera's view changes and it now can detect the keyboard, or alternatively the user may move the keyboard up such that it is in the camera's view and able to be detected), the flow chart proceeds to block 503 in which the camera feed is displayed to the user. A video window may be displayed in the head mountable display which shows at least a part of the camera's view. In order to determine whether the keyboard is in the camera's view, object recognition methods may be performed on the captured images. The user may perform an initial set up to teach the object recognition system what his or her keyboard looks like so as to improve object recognition and the tracking of the keyboard. In FIG. 7A, the user has looked down, i.e. adjusted his real world point of view 602a such that the keyboard 601 is now located within the user's new real world point of view 602a. Following image recognition of the camera's feed at this viewpoint, the keyboard may be detected and an image of the keyboard 601' can be displayed along with the virtual reality environment 602a' (which has a virtual point of view 602a' corresponding to the user's real world point of view 602a). Since a live feed of captured image of the keyboard is presented to the user in a video window overlaying the virtual reality environment, the user is able to see footage 606' of the user's hands 606 in the vicinity of the keyboard such that the user can see him or herself operate the keyboard and select the desired keys for typing.

The camera feed may be cropped such that only the relevant part of the camera feed is displayed, namely that of the keyboard itself as opposed to the entirety of the field of view of camera feed. With the user being able to see the keyboard as well as his or her hands operate the same, the user can input text and respond to the chat window. Once the user has finished using the keyboard, the user can once more look up, as shown in FIG. 8A so that the user's field of view no longer includes the keyboard and the image of the keyboard is no longer displayed as shown in FIG. 8B.

Figure 9A:
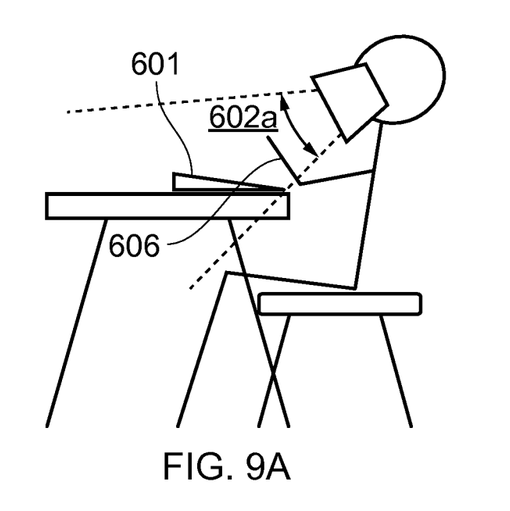
FIGS. 9A and 10A schematically show further use of an apparatus with
  FIGS. 9B and 10B showing corresponding example screenshots of a display of the apparatus.
Figure 9B:
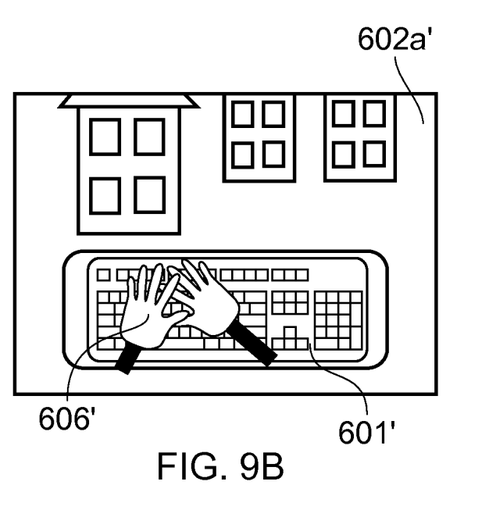
Figure 10A:
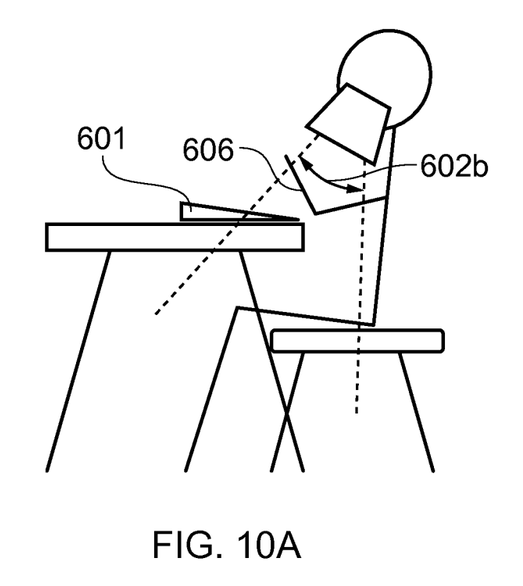
Figure 10B:
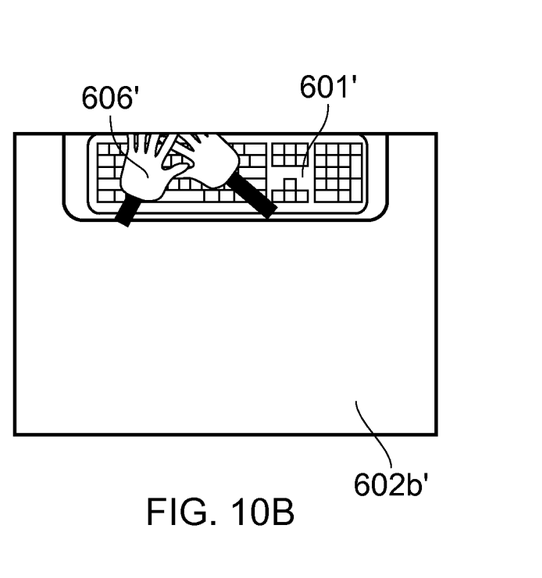

As shown in FIG. 9A, the user's real world point of view 602a is such that the keyboard 601 is located at a bottom portion of the user's real world point of view 602a. The captured image of the keyboard 601' is correspondingly displayed such that it is at a bottom of the virtual field of view of the user's virtual environment 602a'. By contrast, in FIG. 10A, the user's real world point of view 602b is such that the keyboard 601 is located at a top portion of user's real world point of view 602b and correspondingly the captured image of the keyboard 601' is displayed at a top portion of the user's virtual point of view of the virtual environment 602b'. Accordingly, the displayed keyboard image 601' is shown at a position relative to the virtual point of view 602b' corresponding to a position of the actual keyboard relative to the user's real world point of view 602b. This facilitates the user interaction with the keyboard as the image of the keyboard is perceived to be in its appropriate position relative to its true position in real life.

Figure 11A:
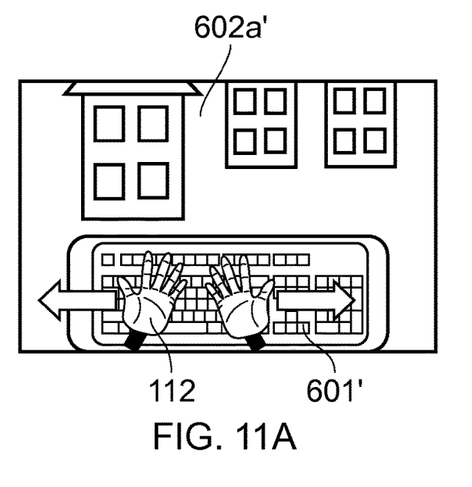
FIGS. 11A and 11B show example screenshots of a display of an apparatus.
Figure 11B:
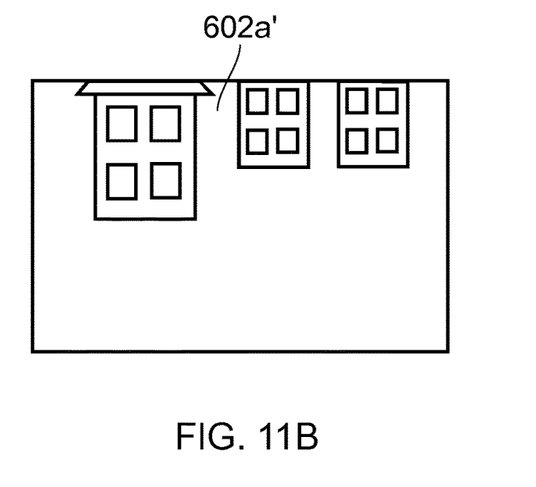

FIG. 11A shows a screenshot of a display of the head mountable display wherein a user looking down on the keyboard is presented with a display of the captured image of the keyboard 601' along with a representation of the virtual world environment 602' having a particular virtual field of view. If the user would not wish to see the displayed captured image of the keyboard 601', the user can perform a gesture with his or her hands 112, for example turning both of his hands palm up and moving them away from each other out of view of the camera. Such a predetermined user input or gesture can be detected and interpreted as a control signal to remove the display of the keyboard 601' following which the image of the keyboard is removed as shown in FIG. 11B. The user's hands may be tracked using object recognition technology to determine the gestures.

Figure 12A:
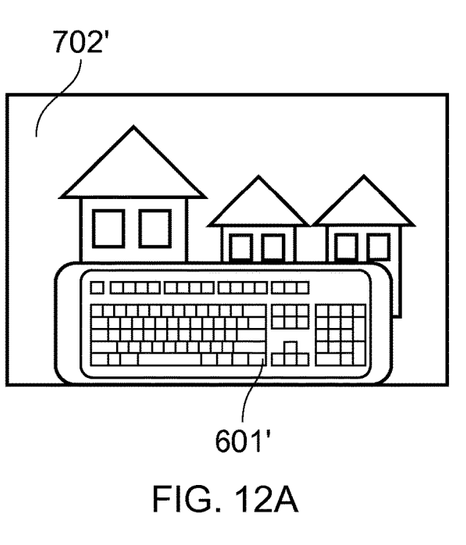
FIGS. 12A and 12B show example screenshots of a display of an apparatus.
Figure 12B:
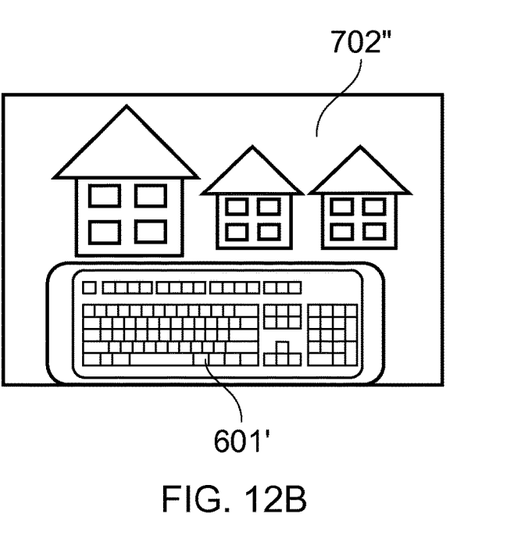

FIGS. 12 and 12B show examples of screenshots of the head mountable display in which the virtual world environment 702a' may be stretched/compressed, morphed or otherwise transformed so as to accommodate the inclusion of the display of a captured image of the keyboard 601' whilst minimising the degree to which the virtual world environment is obscured by the display of the keyboard. As shown in FIG. 12A, the image of the keyboard 601' is simply overlaid on top of a background image of the virtual world environment 702a'. Thus, the image of the keyboard obscures certain aspects of the virtual world environment, for instance the lower level windows of the three houses. In certain examples of the present disclosure, the virtual world environment which is presented is transformed (e.g. adjusting its shape, size and perspective) so as to accommodate the image of the keyboard whilst still keeping everything in the virtual world visible to the user, for example as shown in FIG. 12B, the image of the virtual world 702*a*" is compressed above and below the keyboard and stretched around the keyboard so as to reduce/avoid the overlaid image of the keyboard obscuring the background real world environment. Thus, as shown in FIG. 12B, the ground floor windows of the houses remain visible. In certain examples of the present disclosure, the method may comprise determining whether or not there are any areas/points of interest in the virtual world environment (e.g. lower level windows in the example of FIGS. 12A and 12B) that it would be desirable to maintain display of in spite of the additional display of the keyboard, in which case, the virtual reality environment may be appropriately transformed so as to maximise the visibility of the virtual world environment and in particular, the areas/points of interest in the virtual world environment.

Examples of the present disclosure are described using flowchart illustrations and schematic block diagrams. It will be understood that each block (of the flowchart illustrations and block diagrams), and combinations of blocks, can be implemented by computer program instructions of a computer program. These program instructions may be provided to one or more processor(s), processing circuitry or controller(s) such that the instructions which execute on the same create means for causing implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or steps, or combinations of special purpose hardware and computer program instructions.

Features described in the preceding description may be used in combinations other than the combinations explicitly described.

Although functions have been described with reference to certain features, those functions may be performable by other features whether described or not. Although features have been described with reference to certain examples, those features may also be present in other examples whether described or not.

It should be appreciated that modifications to the examples given can be made without departing from the scope of the invention as at out in the claims.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some or all other examples. Thus 'example', 'for example' or 'may' refers to a particular instance in a class of examples. A property of the instance can be a property of only that instance or a property of the class or a property of a sub-class of the class that includes some but not all of the instances in the class.

In the above description, the apparatus described may alternatively or in addition comprise apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which may collectively implement an embodiment of the present disclosure. In some examples, an apparatus is re-configured by an entity other than its initial manufacturer to implement an embodiment of the present disclosure by being provided with additional software, for example by a user downloading such software, which when executed causes the apparatus to implement an example of an embodiment of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the embodiments of the present disclosure.

Whilst endeavouring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:

1. A method comprising:
   displaying, on a head mountable display, a virtual reality environment;
   determining an opportunity for user interaction with a real world object within the virtual reality environment, wherein the user interaction with the real world object is in response to a request for user input within the virtual reality environment;
   triggering detection of the real world object located in a real world point of view of a user of the head mountable display in dependence upon determining that there is the request for user input within the virtual reality environment, thereby conserving resources by triggering detection of the real world object in response to the request for user input;
   in response to the detection of the real world object located in the real world point of view of the user of the head mountable display, causing one or more images comprising a sequence of captured images, a captured video, images captured in real time, or a live camera feed of at least a part of the detected real world object to be displayed on the head mountable display; and transforming a display of the virtual reality environment displayed on the head mountable display by compressing, stretching, or morphing the virtual reality environment display for simultaneous display of at least one captured image of the real world object and display of the virtual reality environment.

2. The method according to claim 1, wherein the real world point of view of the user of the head mountable display corresponds to a point of view of the user if the user is not wearing the head mountable display.

3. The method of claim 1, further comprising providing a mixing of virtual reality and real world images in which at least one captured image of the real world object is integrated into a display of the virtual reality environment.

4. The method of claim 1, wherein the real world object is a user input device.

5. The method of claim 1, further comprising monitoring the user's real world point of view and positioning the one or more images for display on the head mountable display in dependence on the monitored user's real world point of view.

6. The method of claim 1, further comprising capturing at least one image of the user's real world point of view.

7. The method of claim 1, wherein detection of the real world object in the user's real world point of view comprises performing object recognition on the at least one captured image of the user's real world point of view.

8. The method of claim 1, wherein the live camera feed comprises live footage of the user operating the real world object within the virtual reality environment.

9. An apparatus comprising at least one processor and at least one memory, the memory comprising machine-readable instructions, that when executed cause the apparatus to:
    display, on a head mountable display, a virtual reality environment;
    determine an opportunity for user interaction with a real world object within the virtual reality environment, wherein the user interaction with the real world object is in response to a request for user input within the virtual reality environment;
    trigger detection of the real world physical object located in a real world point of view of a user of the head mountable display in dependence upon determining that there is the request for user input within the virtual reality environment, thereby conserving resources by triggering detection of the real world object in response to the request for user input;
    in response to the detection of the real world object located in the real world point of view of the user of the head mountable display, cause one or more images comprising a sequence of captured images, a captured video, images captured in real time, or a live camera feed of at least a part of the detected real world object to be displayed on the head mountable display; and
    transform a display of the virtual reality environment displayed on the head mountable display by compressing, stretching, or morphing the virtual reality environment display for simultaneous display of at least one captured image of the real world object and display of the virtual reality environment.

10. The apparatus of claim 9, wherein the real world point of view of the user of the head mountable display corresponds to a point of view of the user if the user is not wearing the head mountable display.

11. The apparatus of claim 9 further caused to: provide a mix of virtual reality and real world images in which at least one captured image of the real world object is integrated into a display of the virtual reality environment.

12. The apparatus of claim 9, wherein the real world object is a user input device.

13. The apparatus of claim 9 further caused to: monitor the user's real world point of view and position the one or more images for display on the head mountable display in dependence on the monitored user's real world point of view.

14. The apparatus of claim 9 further caused to: capture at least one image of the user's real world point of view.

15. The apparatus of claim 9, wherein detection for the real world object in the user's real world point of view comprises performing object recognition on the at least one captured image of the user's real world point of view.

16. The apparatus of claim 9, wherein the apparatus is coupled to a chipset, module, device, or the head mountable display.

17. The apparatus of claim 9, wherein the live camera feed comprises live footage of the user operating the real world object within the virtual reality environment.

18. A computer program product comprising a non-transitory computer readable medium comprising instructions that, when executed by a processor, configure the processor to:
    display, on a head mountable display, a virtual reality environment;
    determine an opportunity for user interaction with a real world object within the virtual reality environment, wherein the user interaction with the real world object is in response to a request for user input within the virtual reality environment;
    trigger detection of the real world object located in a real world point of view of a user of the head mountable display in dependence upon determining that there is the request for user input within the virtual reality environment, thereby conserving resources by triggering detection of the real world object in response to the request for user input;
    in response to the detection of the real world object located in the real world point of view of the user of the head mountable display, cause one or more images comprising a sequence of captured images, a captured video, images captured in real time, or a live camera feed of at least a part of the detected real world object to be displayed on the head mountable display; and
    transform a display of the virtual reality environment displayed on the head mountable display by compressing, stretching, or morphing the virtual reality environment display for simultaneous display of at least one captured image of the real world object and display of the virtual reality environment.

\* \* \* \* \*